US005749933A

United States Patent [19]

Ghorpade et al.

[11] Patent Number: 5,749,933
[45] Date of Patent: May 12, 1998

[54] APPARATUS AND METHOD FOR PRODUCING GLASS FIBERS

[75] Inventors: Sureshchandra Chintaman Ghorpade; Jack Everett Chittum, both of Littleton, Colo.; Mark Anthony Romero, Tucson, Ariz.

[73] Assignee: Johns Manville International, Inc., Denver, Colo.

[21] Appl. No.: 623,495

[22] Filed: Mar. 28, 1996

[51] Int. Cl.⁶ .......................... C03B 37/095; C03B 5/44; C03B 37/10

[52] U.S. Cl. .................. 65/511; 65/493; 65/510; 65/512; 65/374.12

[58] Field of Search .................. 65/493, 510, 511, 65/512, 374.12

[56] References Cited

U.S. PATENT DOCUMENTS

| | | | |
|---|---|---|---|
| 3,647,382 | 3/1972 | Tilbrook | 65/12 |
| 4,326,871 | 4/1982 | Harris | 65/12 |
| 4,397,665 | 8/1983 | Harris | 65/12 |
| 4,463,060 | 7/1984 | Updegraff | 428/669 |
| 4,941,903 | 7/1990 | Jensen | 65/1 |
| 5,244,483 | 9/1993 | Brosch et al. | 65/12 |

*Primary Examiner*—Peter Chin
*Assistant Examiner*—Jacqueline A. Ruller
*Attorney, Agent, or Firm*—Robert D. Touslee

[57] ABSTRACT

In a method of making fibers in which molten glass is extruded through orifices in a bushing and cooled with cooling apparatus mounted below the bushing to form the fibers, it has been discovered that using new alloys containing a major amount of palladium and a minor amount of either iridium or nickel to make the cooling members or apparatus offers many advantages. Using semi-automatic welding to attach separate parts of the cooling members or apparatus minimizes porosity in the weld and increases service life.

27 Claims, No Drawings

APPARATUS AND METHOD FOR PRODUCING GLASS FIBERS

TECHNICAL FIELD

The present invention relates to improved cooling apparatus and to a method of using the improved apparatus to make glass filament or fiber products. Using the invention requires a lower capital cost in the filament forming apparatus than platinum-rhodium alloys and produces a more uniform cooling rate over a multitude of fiber forming sites throughout the life of the bushing which produces higher fiber forming efficiencies and lower fiber manufacturing costs. More particularly the apparatus relates to improved cooling means for absorbing heat from tips on a fiberizing bushing and from molten glass as the molten glass emerges from the tips to be formed into glass fibers.

BACKGROUND

The present invention is an improvement in the apparatus and methods of using the apparatus disclosed in U.S. patent application Ser. No. 317,854, filed Dec. 22, 1972 by Walter W. Harris, now abandoned, and U.S. Pat. No. 5,244,483, issued to Eric J. Brosch et al on Sep. 14, 1993, which disclosures are hereby incorporated herein by reference.

In well known processes, glass fibers are formed by extruding molten glass through a multitude of small nozzles called tips on the bottom of a metal container called a bushing. The bushing is usually heated to the appropriate temperature by its own electrical resistance and is usually constructed of precious metal alloys like an alloy of 80 percent platinum and 20 percent rhodium. The bushing is fed usually with molten glass from a forehearth, but can be fed with glass marbles, pellets, etc. in which case the bushing is deeper and the marbles are melted in the top part of the bushing and the molten glass then flows into a lower portion. In either case the bushing has a multiplicity of nozzles or tips on the bottom surface in which the molten glass flows through to form fibers.

When the molten glass exits the tips it forms beads which fall away from the tips when the their size reaches a certain volume. As each bead falls it trails a fiber behind. Once all the tips have beaded out, all of the fibers are gathered into a strand, the strand is cut to form a new end, and the new end is fed into a chopper or a winder which pulls the strand at high speed which attenuates each molten glass bead into a cone and attenuates the still soft fiber at the end of the cone into the desired diameter after which the fiber cools to rigidity. The distance between the top of the tip and the point where the fiber cools sufficiently to stop attenuation is less than a few inches and often only about an inch or less. If this distance is longer frequent breaks and flooding of the bushing will occur, which is unsatisfactory because it reduces productivity and increases manufacturing cost substantially. With the fiber moving at 25 to over 60 miles per hour, much heat must be removed in a very short time and distance and special apparatus is required to remove the heat from the tips, beads, cones and fibers immediately below the bushing.

Two types of cooling or heat exchanging apparatus are usually used to remove this heat and cool the tips and molten glass. One type of apparatus is usually called a fin shield cooler and involves long fins that run perpendicular to the long dimension of the bushing and pass next to a row of tips with at least one end of each fin being attached to a pipe or manifold in which a cooling fluid like water is flowing. This type of cooling apparatus is shown in U.S. Pat. No. 3,841,853, the disclosure of which is hereby incorporated by reference.

The other type of cooling apparatus is typically called cooling tubes and involves long tubes, with or without one or more fins, that run parallel to and near one or more rows of tips along the long dimension of the bushing. These types of cooling apparatus are disclosed in U.S. Pat. No. 5,244,483, the disclosure of which is hereby incorporated by reference. The service demands on the tubes, which are water cooled, are extreme. The tubes must be able to withstand the high temperatures associated with glass fiber production in a corrosive environment. Further, such heat exchange devices must not be too rigid as they need to be bendable or formable to match the surface contour of the bushing tip plate over its service life.

In the first type of cooling apparatus the fins are usually made of copper for good thermal conductivity and plated with nickel or some other metal which resists corrosion from the abusive atmosphere to which this apparatus is exposed. The cooling apparatus is exposed to high temperature radiation, hot volatile sodium borate gases containing sulfur and sometimes fluorine which combine with high humidity air around the bushing to form corrosive acids and salts. Copper alone would not hold up in this atmosphere and even plated copper has to be replaced too frequently.

As noted in U.S. Pat. No. 5,244,483, the cooling tubes of the second type of cooling apparatus must be made from precious metals to provide both the necessary cooling function, to hold up to the corrosive atmosphere, and to be strong enough to avoid warping and sagging in the arrangement shown in this patent. Heretofore, it was known to use alloys of platinum and rhodium for these tubes and fins, which alloys are very expensive and tie up a lot of capital investment. Over the past five years platinum has cost as much as about $517 per troy ounce and rhodium has been as high as more than $5000 per troy ounce. This necessary investment was reduced by the use of alloys of palladium and ruthenium as disclosed in the '483 patent, which over the same period have cost as much as about $180 and $70 per troy ounce respectively.

While the tubes and fins made of alloys of palladium and ruthenium greatly reduced the investment required and hold up satisfactorily to the corrosive atmospheres involved, it has been found over years of experience that there is still room for needed improvement. The palladium/ruthenium finned cooling tubes are so strong and rigid ("springy") that it is difficult to bend them in place to make them conform to the sagging rows of tips which occurs with time due to high temperature sag of the platinum rhodium alloy bushing bottom. Also, metal loss has been higher than desired over a one to two year average life, especially in applications where the glass contained significant fluorine. The palladium/ruthenium cooling tubes tend to develop a black coating close to Inconel guide bars holding the cooling tubes in place and this coating will not wash off with water, which is the way cooling tubes are cleaned while in place. One other disadvantage of using ruthenium is that it is toxic and welding releases ruthenium tetra oxide volatiles that require special environmental control.

It is important that the tubes be strong to provide integrity to the entire fiberizing assembly, but it is preferred that the tubes or finned tubes are bendable in place so that they can be shaped to remain parallel to one or more rows of tips that sag more in the middle of the bushing than near the ends. If the cooling tubes and fins are not reformed or bent to keep a uniform distance between the tips and the tube and/or fin, the tips and cones of molten glass will not be uniformly cooled and will cause greater fiber diameter variation and increased fiber breaks reducing productivity.

This shortcoming can be overcome by removing the tubes for bending, but this requires more labor and results in some loss of production. This problem usually is most noticeable in the latter portion of the life of the bushing and sometimes leads to removing the bushing a little earlier than would have been necessary if the tube was more easily bendable. Thus a need remains for tubes and fins that perform in all ways like alloys of platinum and rhodium, but cost substantially less.

DESCRIPTION OF THE INVENTION

Accordingly, the present invention comprises precious metal alloy compositions and precious metal cooling apparatus comprising palladium and a minor amount of either iridium or nickel. The invention also comprises an improvement to the tip and molten glass cooling apparatus used with bushings to make glass fibers, which cooling apparatus comprises a plurality of fins, tubes and/or tubes having one or more fins thereon and to the method of using such apparatus to make glass fibers. This improvement involves the use of alloys of palladium containing minor amounts of either nickel or iridium. Although other levels will work, less than 10 percent iridium or less than 8 percent nickel are typically used in the tubes, fins or finned tubes of the cooling apparatus. In the preferred embodiments, palladium alloys containing 2-8 percent iridium or 1-5 percent nickel are useful and most preferred are finned tubes made from alloys containing either 95 percent palladium and 5 percent iridium or 98 percent palladium and 2 percent nickel performed like finned tubes made from 80 percent platinum and 20 percent rhodium.

Iridium has cost as much as about $330 per troy ounce and nickel has cost far less, as much as $1 or less per troy ounce over the last five years, which keeps the investment required for the inventive alloy tubes, etc. far below that of 80 percent platinum, 20 percent rhodium alloy. All percentages used herein are weight percentages.

Using cooling apparatus made from alloys containing a major amount of palladium and a minor amount of either iridium or nickel mounted below the bottom of a fiber forming bushing to make glass fibers results in lower capital investment and similar performance to using cooling apparatus made from alloys of 80 percent platinum and 20 percent rhodium. In a method of making glass fibers wherein molten glass is extruded through orifices in a heated bushing to form beads or streams and wherein said beads or streams are cooled with cooling means mounted beneath the bushing and wherein the beads or streams are pulled to produce glass fibers, the improvement of the present invention comprises using cooling means made from an alloy selected from the group consisting of alloys of palladium and iridium wherein the iridium content is between about 1 percent and about 10 percent and alloys of palladium and nickel wherein the nickel content is between about 1 percent and about 8 percent. Generally, the iridium content is in the range of about 3-7 percent or the nickel content is in the range of about 1-5 percent. Using cooling apparatus made of alloys of either 95 percent palladium and 5 percent iridium or 98 percent palladium and 2 percent nickel are particularly preferred.

When it is required to weld the precious metal alloys of the invention it has also been discovered that using a method of semi-automatic TIG welding minimizes porosity in the weld and adds to the useful life of the cooling apparatus.

DETAILED DESCRIPTION OF THE INVENTION

Cooling tubes, preferably cooling tubes with fins (see FIG. 4 of the '483 patent), were made with alloys of 95 percent palladium and 5 percent iridium and 98 percent palladium and 2 percent nickel were made using the procedure set out in the '483 patent and evaluated in production.

Cooling tubes made of the alloy of 95-95.5 percent palladium and 4.5-5 percent ruthenium of the '483 patent have average useful lives of about two plus years (about one year if the glass contains a significant amount of fluorine) and this is considered a satisfactory life, but a longer life is desirable. If the life of the tube is much shorter than this, the cost of rebuilding tubes and changing tubes at shorter intervals, and the reduction in fiberizing efficiency this causes, offsets the savings of using alloys of lower cost than platinum rhodium or the higher efficiency and longer bushing life that an easier bending tube than the palladium-ruthenium alloy tube produces.

Initially, the Pd/Ir alloy finned cooling tubes and the Pd/Ni finned cooling tubes, made by manually TIG (tungsten inert gas) welding of the cooling fins onto the tubes, used in fiberizing glass containing significant amounts of fluorine, developed water leaks that shortened the lives of the tubes to less than satisfactory. These leaks occurred along the welds holding the cooling fins onto the tubes. It was felt that inconsistencies in welding and excessive weld porosity, even though the welds were made with very experienced welders of precious metals using proven welding techniques, were the cause of he water leaks.

To test this theory, finned cooling tubes were made using semi-automatic welding. In this procedure a semi-automatic welding machine, such as a Jetline semi-automatic welder made by Jetline Engineering, Inc. of Irvine, Calif., is set up manually, but the weld is made by a mechanical device which moves the welding torch along the fin and tube at a constant speed. This technique produces a weld only about 25 percent as wide as a manual weld and in a much shorter time, e. g. in about 6 minutes versus about 30 minutes required for manual welding. The higher quality weld, in terms of consistent heat treatment, much less time at elevated temperature and a smaller weld affected area, produced by semi-automatic welding reduced the weld porosity and solved the premature water leaking problem.

The semi-automatic welding parameters used are shown in the Table below.

TABLE

| Attribute | Level |
| --- | --- |
| Preflow time (seconds) | 5 |
| Start level time | |
| (seconds) | 0.003 |
| (amps) | 8 |
| Initial time | |
| (seconds) | 3 |
| (amps) | 6 |
| Initial slope time (seconds) | 1 |
| Pulse mode | On |
| Weld time Ref. (seconds) | 94.2 |
| Pulse frequency (pulses/second) | 8 |
| Pulse peak time (% peak) | 40 |
| Pulse peak (amps) | 57 |
| Pulse background (amps) | 12 |
| Average current (amps) | 30 |
| Final slope time (seconds) | 1 |
| Final time | |
| (seconds) | 0.2 |
| (amps) | 1.5 |
| Post flow time (seconds) | 6 |
| Relay #1 start delay (seconds) | 12.5 |
| Relay #1 stop delay (seconds) | 0 |
| User relay #2 | Disabled |

| Attribute | Level |
| --- | --- |
| Volt/amp metering | Enabled |

To weld a fin onto a cooling tube first the fin and tube of the alloys described above can be annealed at 1650 degrees F. for about 5 minutes and water quenched, but this is not necessary. A fin and one or more fins are placed in a holding fixture, usually water cooled, on the welding machine and the electrode of the welder is centered over where a welding seam is to be placed and positioned over the start point of the weld. The weld is then made using the above attributes.

Fully automatic welding could also be used where the volume justified the higher cost of the equipment. While semi-automatic welding is critical to good tube life for applications where the glass contains corrosive amounts of fluorine, manual welding is acceptable for making finned tubes for many applications where corrosive amounts of fluorine are not present.

Tubes of the present invention have longer service lives, 1 year or more in fluorine containing and 2.1 years or more in fluorine free glass, and also produce a higher average fiberizing efficiency over the life of the tubes than the palladium cooling tubes disclosed in U.S. Pat. No. 5,244,483.

Other modifications and embodiments will be apparent to those skilled in the art and to the extent they use the invention disclosed herein, or equivalents thereof, and all are intended to be within the scope of the claims below.

We claim:

1. An improved apparatus for making glass fibers comprising a bushing for holding molten glass with orifices in said bushing for extruding said molten glass into beads and streams for forming glass fibers, cooling members for cooling said molten glass as it exits said orifices to form beads or cones and fibers, the improvement comprising said cooling members having parts thereof of alloys selected from the group consisting of alloys of palladium containing a minor amount of iridium and alloys of palladium containing a minor amount of nickel.

2. The apparatus of claim 1 wherein said cooling apparatus is a cooling tube.

3. The apparatus of claim 2 wherein said cooling tube has at least one fin attached thereto and wherein said alloy contains about 3–7 percent iridium.

4. The apparatus of claim 3 wherein said at least one fin is attached to said tube with a weld.

5. The apparatus of claim 4 wherein said weld is a consistent weld of the type made using electro-mechanical means to hold, control and move a welding electrode.

6. The apparatus of claim 2 wherein said alloy contains about 5 percent iridium.

7. The apparatus of claim 3 wherein said alloy contains about 5 percent iridium.

8. The apparatus of claim 4 wherein said alloy contains about 5 percent iridium.

9. The apparatus of claim 5 wherein said alloy contains about 5 percent iridium.

10. The apparatus of claim 1 wherein said cooling means is a fin attached to a cooling manifold.

11. The apparatus of claim 2 wherein said cooling tube has at least one fin attached thereto and wherein said alloy contains about 2–5 percent nickel.

12. The apparatus of claim 11 wherein said at least one fin is attached to said tube with a weld.

13. The apparatus of claim 12 wherein said weld is a consistent weld of the type made using electro-mechanical means to hold, control and move a welding electrode.

14. The apparatus of claim 11 wherein said alloy contains about 2 percent nickel.

15. The apparatus of claim 12 wherein said alloy contains about 2 percent nickel.

16. The apparatus of claim 13 wherein said alloy contains about 2 percent nickel.

17. The apparatus of claim 1 wherein the alloy contains about 98 percent palladium and about 2 percent nickel.

18. In a method of making glass fibers wherein molten glass is extruded through orifices in a heated bushing to form beads or streams and wherein said beads or streams are cooled with cooling means mounted beneath said bushing and wherein said beads or streams are pulled to produce glass fibers, the improvement comprising using water cooled cooling means made from an alloy selected from the group consisting of alloys of palladium and iridium wherein the iridium content is between about 1 percent and about 10 percent and alloys of palladium and nickel wherein the nickel content is between about 1 percent and about 8 percent.

19. The method of claim 18 wherein said alloy contains about 93–97 percent palladium and about 3–7 percent iridium.

20. The method of claim 18 wherein said alloy contains about 95 percent palladium and about 5 percent iridium.

21. The method of claim 18 wherein said alloy contains about 95–99 percent palladium and about 1–5 percent nickel.

22. The method of claim 18 wherein said alloy contains about 98 percent palladium and about 2 percent nickel.

23. The method of claim 18 wherein the cooling means comprise cooling tubes.

24. The method of claim 19 wherein the cooling means comprise cooling tubes.

25. The method of claim 20 wherein the cooling means comprise cooling tubes.

26. The method of claim 21 wherein the cooling means comprise cooling tubes.

27. The method of claim 22 wherein the cooling means comprise cooling tubes.

* * * * *